US012627389B2

(12) United States Patent
Jaisimha et al.

(10) Patent No.: US 12,627,389 B2
(45) Date of Patent: *May 12, 2026

(54) PROJECTION MODE FOR VEHICLE RECEIVER SOURCES

(71) Applicant: Panasonic Automotive Systems America, LLC., Peachtree City, GA (US)

(72) Inventors: Shree Jaisimha, Senoia, GA (US); Arun Krishnan Padmakumar, Peachtree City, GA (US); Nicholas Cook, Sheboygan, WI (US)

(73) Assignee: Panasonic Automotive Systems America, LLC

( * ) Notice: Subject to any disclaimer, the term of this patent is extended or adjusted under 35 U.S.C. 154(b) by 253 days.

This patent is subject to a terminal disclaimer.

(21) Appl. No.: 18/214,672

(22) Filed: Jun. 27, 2023

(65) Prior Publication Data

US 2023/0353267 A1    Nov. 2, 2023

Related U.S. Application Data

(63) Continuation of application No. 17/519,619, filed on Nov. 5, 2021, now Pat. No. 11,728,915.

(Continued)

(51) Int. Cl.
*H04H 60/85*     (2008.01)
*H04B 1/08*      (2006.01)
(Continued)

(52) U.S. Cl.
CPC ............. *H04H 60/85* (2013.01); *H04B 1/082* (2013.01); *H04H 20/72* (2013.01); *H04H 60/44* (2013.01); *H04H 60/48* (2013.01)

(58) Field of Classification Search
CPC ........ H04H 60/85; H04H 20/72; H04H 60/44; H04H 60/48; H04H 20/24; H04H 20/26; H04H 60/80; H04B 1/082
See application file for complete search history.

(56) References Cited

U.S. PATENT DOCUMENTS 10,868,621 B1 * 12/2020 Venezia ................. H04H 60/73
11,553,245 B1 *  1/2023 Clift ................... H04N 21/4383
(Continued)

OTHER PUBLICATIONS

ETSI TS 103 270 Version 1.3.1 (May 2019), RadioDNS Hybrid Radio: Hybrid lookup for radio services; Website: https://radiodns.org/.

(Continued)

*Primary Examiner* — Ankur Jain
(74) *Attorney, Agent, or Firm* — Laurence S. Roach

(57)          ABSTRACT

Examples of the present disclosure relate to a device, method, and system for integrating a projection mode of a user mobile device with a terrestrial tuner. In an example, the system may be a vehicle including a head unit and a vehicle projection stack to operate in the head unit. The system may also include a terrestrial tuner communicatively coupled to the vehicle projection stack to receive a terrestrial signal from a terrestrial source. The system may also include an audio driver to provide an audio signal to a vehicle interior where the audio signal is from at least one of the terrestrial signal and an internet signal received at the vehicle projection stack from a user mobile device located inside the vehicle interior.

18 Claims, 12 Drawing Sheets

100

Related U.S. Application Data

(60) Provisional application No. 63/111,680, filed on Nov. 10, 2020.

(51) Int. Cl.
    *H04H 20/72*         (2008.01)
    *H04H 60/44*         (2008.01)
    *H04H 60/48*         (2008.01)

(56)               References Cited

U.S. PATENT DOCUMENTS

| | | | |
|---|---|---|---|
| 2010/0146573 A1* | 6/2010 | Richardson | H04N 21/47202<br>707/769 |
| 2016/0380713 A1* | 12/2016 | Whikehart | H04H 60/88<br>709/219 |
| 2020/0382818 A1* | 12/2020 | Lee | H04N 21/8106 |
| 2021/0368244 A1* | 11/2021 | Guajardo | H04W 36/302 |
| 2022/0190944 A1* | 6/2022 | Day | H04N 21/812 |

OTHER PUBLICATIONS

Industry standards for Connected Radio for AMFMHD and DAB; Website: https://radiodns.org/developers/documentation/.

* cited by examiner

100

200

300

400

120 — Content Application

118 — UMD Extender Application

112 — Vehicle Extender Application

502 — Send Applications Request

504 — Application Info Return

506 — Terrestrial Tuner Capabilities Request

508 — Terrestrial Tuner Capabilities Response

510 — Capabilities Confirmation

500

600

800

702

Content Delivery
Network

102

UMD

106

Head Unit

902

User Tunes to
a AM/FM Station
and Hears Audio
From Head Unit
Terrestrial Tuner
While in
Projection Mode

904

Sends Meta Data
to Phone

906

Station ID
Information for
Lookup

908

Phone Gets the IP
URL and Prepares
HTTP or HTTPS
Access to the URL

910

UMD App Shares
Recommended and
Personalization
List to Head Unit

900

1002

Head Unit

Terrestrial Tuner

1006

Vehicle Projection Stack

1004

Audio Driver

1008

1000

Receive a Terrestrial Audio Signal from a Terrestrial Source at a Terrestrial Tuner Communicatively Coupled to a Vehicle Projection Stack    1102

Instruct with the Vehicle Projection Stack, an Audio Driver to Provide an Audio Signal to a Vehicle Interior    1104

1100

1002

Head Unit

Terrestrial Tuner

1006

Processor

1202

Vehicle Projection Stack

1004

Audio Driver

1008

Wireless Communication Component

1204

1200

PROJECTION MODE FOR VEHICLE RECEIVER SOURCES

CROSS-REFERENCED TO RELATED APPLICATIONS

This application is a continuation of U.S. patent application Ser. No. 17/519,619, filed on Nov. 5, 2021, which is currently under allowance, which claims benefit of U.S. Provisional Application No. 63/111,680, filed on Nov. 10, 2020, the disclosures of which are hereby incorporated by reference in their entireties for all purposes.

FIELD OF THE INVENTION

The present disclosure generally relates to a method, system, and device to integrate car cabin media sources received at a terrestrial tuner with the functionality of a user device, such as a smartphone. More specifically, the present disclosure relates to a number of use cases including simulcast audio, seamless content delivery from home to phone to vehicle, increasing vehicle media utility by pairing data delivery and applications from a mobile device with the terrestrial tuner of a vehicle.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

Vehicles can include a head unit which is a component providing a unified hardware interface for the system and may include screens, buttons and system controls for numerous integrated information and entertainment functions. Vehicles may also include a terrestrial tuner, for example, a radio antenna typically used for picking up radio station signals. Terrestrial tuners refer generally to the hardware used by a vehicle to detect land-based radio waves being broadcasting from a geographic location with enough strength to be detected and converted to audio data or other data.

SUMMARY

Generally, the present techniques relate to a system for integrating a projection mode of a user mobile device with a terrestrial tuner. The system may be a vehicle including a head unit and a vehicle projection stack to operate in the head unit. The system may also include a terrestrial tuner communicatively coupled to the vehicle projection stack to receive a terrestrial signal from a terrestrial source. The system may also include an audio driver to provide an audio signal to a vehicle interior where the audio signal is from at least one of the terrestrial signal and an internet signal received at the vehicle projection stack from a user mobile device located inside the vehicle interior. The present techniques further include a method for tracking a driver location in a vehicle. The method may include receiving a terrestrial signal from a terrestrial source at a terrestrial tuner communicatively coupled to a vehicle projection stack, the vehicle projection stack operating in a head unit of a vehicle. The method may also include instructing, with the vehicle projection stack, an audio driver to provide an audio signal to a vehicle interior where the audio signal is from at least one of the terrestrial signal and an internet signal received at the vehicle projection stack from a user mobile device located inside the vehicle interior.

The present techniques also include a system for a vehicle with wireless communication components for integrating terrestrial tuner information. The system for the vehicle may include a head unit and a processor to operate in the head unit. The system for the vehicle may include a vehicle projection stack to operate on the processor as well as a wireless communication component in the head unit to enable wireless communication to a user mobile device located inside a vehicle interior. The system for the vehicle may include a terrestrial tuner communicatively coupled to the vehicle projection stack to receive a terrestrial signal from a terrestrial source. The system for the vehicle may include an audio driver to provide an audio signal to the vehicle interior where the audio signal is from at least one of the terrestrial signal and an internet signal received at the vehicle projection stack through the wires communication component connecting the head unit to the user mobile device located inside the vehicle interior.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

3

Figure 12:
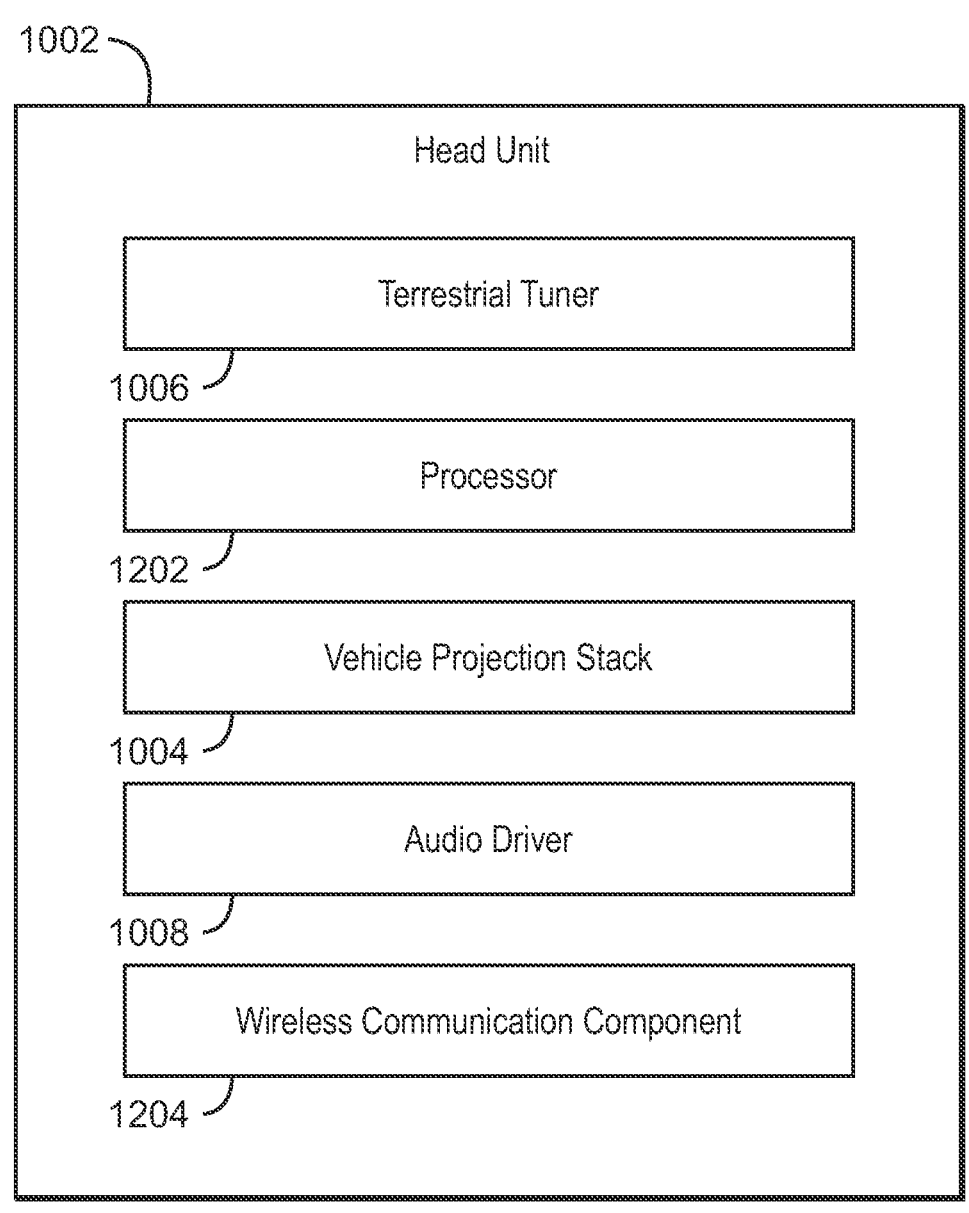

FIG. 12 is a block diagram of an example system for a vehicle with wireless communication components for integrating terrestrial tuner information.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

As indicated above, vehicles may include terrestrial tuners such as vehicle antennas that receive radio waves transmitted from land-based broadcasts. Users of the vehicle may use their mobile devices to consume media such as music, podcasts, audio books, movies, or news updates, and this media is often delivered through the use of a cellular modem in the mobile device. Some mobile devices contain terrestrial tuners themselves in order to detect and receive radio signals such as frequency modulation (FM) radio wave signals. Terrestrial tuners in the mobile devices of users however are often limited in their reception due to the smaller form factor of the physical receiver or interference from nearby electrical components. Accordingly, there are benefits of connecting and integrating the operation of the user mobile device with the terrestrial tuner of a vehicle to increase using the techniques disclosed herein.

Many vehicles include head units also known as automotive head units. These head units can take many form factors and have a variety of features but generally refer to a component in a vehicle providing a unified hardware interface for the system and may include screens, buttons and system controls for numerous integrated information and entertainment functions. In an example, the head unit may not include a display. In an example, a head unit may not include physical pressable buttons and may be interacted with through touch detection or gestures. The head unit may be a mobile device of the user. In an example, the head unit may be a mobile device of a user and the user may interact with the vehicle through their mobile device acting as the head unit of the vehicle. The head unit may be connected to and exchange data with the terrestrial tuner of the vehicle. The head unit may also communicate with a user mobile device in order to share functionality and hardware usage between the user mobile device and the head unit of the vehicle. In some cases, the user mobile device may serve as an extension of, or in place of, the automotive head unit. For example, the user mobile device may be the phone of a driver or passenger of the vehicle. The user may wish to play a song stored or streamed through their phone on the speakers of the vehicle and communicate through the head unit to transmit the music data through a processor that can instruct the speakers to play the music. When the mobile device is communicating with the head unit to transmit data from the phone or an application on the phone, such as a streaming service, this transmission to the head unit of the vehicle may be called a projection mode.

Projection mode allows for media content or other content to be brought into the vehicle even if the vehicle itself does not have the same applications downloaded or subscriptions verified as the user with the device. For example, if a user mobile device were attempting to play music from a subscription music service and only the user mobile device had that application downloaded and logged in, projection mode would enable the mobile device to transmit not only output media data but potentially also application functionality to the head unit of the vehicle. For example, the application may enable liking or creating a playlist on a heads-up display on the application projected from the user mobile device through vehicle hardware even if the vehicle otherwise did not have access to the subscriber account with the user device. In a projection mode case, the content applications could have their audio and/or video encoded using a video compression scheme such as H.264 or H.265 and shared back to the head unit. The head unit could decode the content and allow for the vehicle driver to experience the content on the head unit display. Any user press on the head unit display is then shared back to the content application.

There are a number of protocol formats that accommodates audio, display data, sensor and input exchange in projection mode, however the present techniques support integration techniques for Receiver Sources. As used herein, receiver sources refer to at least one of amplitude modulation (AM) and frequency modulation (FM), in-band on-channel (IBOC) methods for radio wave transmission such as HD RADIO (HD) which is a registered trademark iBiquity Digital Corporation, digital audio broadcasting (DAB), Digital Radio Mondiale (DRM), or satellite radio transmissions. The integration of these receiver sources can be managed between the head unit of the vehicle and a management application on the user mobile device.

One improvement of the presently disclosed techniques is the ability to provide updated functionality to a vehicle without the computational capacity as a result of being older or having fewer features with regard to multimedia or accounts than the mobile device of the user. For example, some vehicles may include radio reception for AM/FM/HD/DAB radio but not include fourth generation (4G) or fifth generation (5G) connectivity access natively in the vehicle. The present techniques would enable a user to connect the head unit of a vehicle to a management application on the user mobile device of the user to enhance user experience augmentation. 6.26. This increase in functionality for a vehicle not only increases functionality but would be cheaper than replacing the hardware of the vehicle or the vehicle itself. In another example, vehicles with older radios with no 4G or 5G connectivity but still have antennas to detect satellite radio, such as SIRIUS XM RADIO (SXM) a trademark of SIRIUS XM Radio Inc., these users could enable an SXM application on their phone to provide additional metadata and content from 4G/5G cellular data to the head unit for supplementing SXM displayed and played media.

The disclosed protocol framework extends present mobile device to vehicle functionality by expanding beyond pairing of navigation apps and music apps by additionally providing a support for receiver source integration and related use cases that leverage head unit and mobile device connection. These use cases can include improvements that use both cloud access through data transmission enabled by the mobile device together with access and functionality of access to the terrestrial tuner in a vehicle. Some existing vehicle and user mobile device pairing applications require a user to exit a paired application in order to access media received form the vehicle. The present techniques would provide further integration of this receiver source into a unified interface for managing media from a terrestrial tuner as well as other integrated sources obtained through the user mobile device.

The presently disclosed extender application integrates the mobile device and terrestrial tuner capabilities and is operated from the head unit of the vehicle but also could include an associated application installed on the user mobile device. In the vehicle based extender application, arbitration logic could be implemented to manage both internet audio and terrestrial audio for service linking when needed. The techniques disclosed herein improve the practical application in a number of ways including allowing the end user to leverage their existing data plan in allowing them to increase their content in the car by leveraging cloud connectivity from the user mobile device. Another improvement in practical application is how these techniques enable vehicles without the disclosed functionality to experience, for example, the hybrid radio connected radio experience involving podcasts, video, on demand that a mid or high-end vehicle with a cellular modem would experience. Another improvement in practical application is how these techniques enable vehicles with limited bandwidth to be paired using the disclosed techniques to enable cloud functionality through a user mobile device to enhance the end user experience with better metadata, images, and content provided to these vehicle head units. Another improvement in practical application is how these techniques enable electric or hybrid vehicles which can generate relatively larger amounts of electrical interference for the AM radio wave band, to experience an AM station list and related content from the simulcast audio on the cloud. Another improvement in practical application is how these techniques enables content providers and intellectual property (IP) licensers more accurate data about the content provided to users as well as options in the delivery method. These increased functionalities can enable IP licensers with increased options for paying royalties in a cost effective manner in cases where digitally streamed content and broadcast content are priced differently. For example, if the payment due to an IP license holder was twice as much for a broadcast payment unit compared to a streaming payment unit, the management app could be configured to adjust the source of the content in cases where both options were available in similar quality.

As security is an important consideration for any communication with the vehicle, applications or internet content provided to the vehicle through the user mobile device could in some cases be limited to Hypertext Transfer Protocol Secure (HTTPS) links. For vehicles with suitable hardware but not the firmware to enable the disclosed functionality, these head units and radios could be upgraded with firmware updates through over the air update both initially and as further communication protocol updates were deployed through the use of the disclosed content application.

The ability to switch from terrestrial tuner to data delivered through a user mobile device includes enabling content following for the end user using these content applications on their phone or digital assistant devices starting in their home, merging to when a user gets into their vehicle to start a trip, and then potentially switching or increasing functionality to the terrestrial tuner found in the vehicle. Further, the presently disclosed techniques increases the number of tuners within each band thereby allowing the disclosed vehicles extender application to decide if it needs to get e.g., a radio station list or a content channel guide from the content application utilizing cloud access facilitated through the user mobile device.

In the extender application, the analysis of connectivity allows for the vehicle extender app to know if the head unit has a connectivity subscription. If the connectivity is invalid or if there is no subscription, the vehicle extender app can utilize the data rate plan on the end user mobile device to interact with the content application. The Vehicle Extender App running on the user mobile device will in turn check on subscription status on the user mobile device. In the disclosed extender application, the display resolution functionality could be provided to the vehicle extender app to inform the extender application of the image resolution it needs to consider when getting from the cloud through the user mobile device. Different head units may have different capabilities and characteristics, for example, display resolution, and the intent of this communication is to ensure a content application on a user mobile device can get the most suitable image that matches the display resolution to ensure best in quality experience. This may help to avoid instances involving an image of lower resolution that is up-sampled to fit a defined resolution resulting in a decreased user experience.

Figure 1:
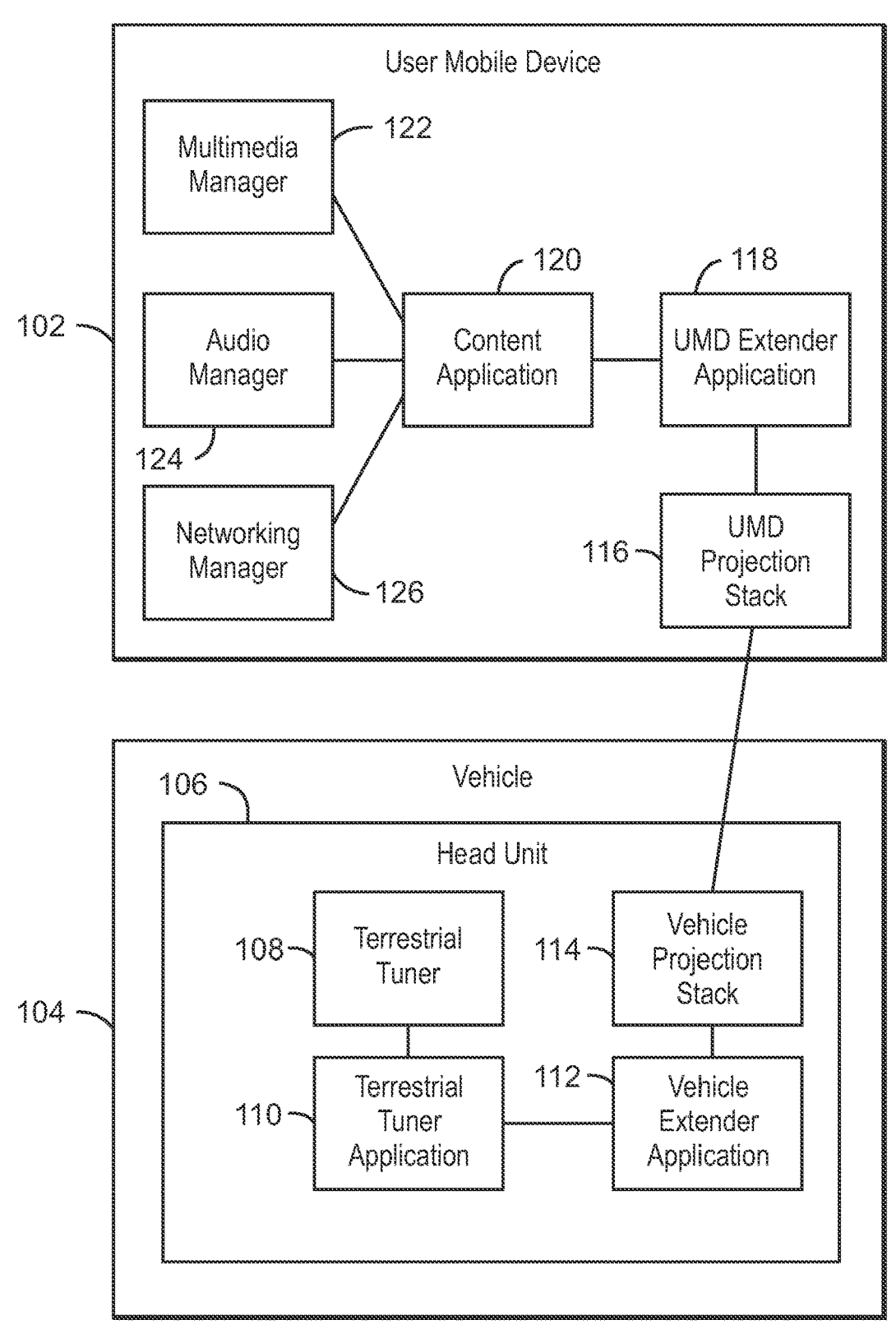
FIG. 1 is a block diagram of an example system for integrating a terrestrial tuner into a projection mode of a user mobile device.

FIG. 1 is a block diagram of an example system 100 for integrating a terrestrial tuner into a projection mode of a user mobile device. Lines shown connecting items in these figures generally refer to communicative pathways that enable data to be transferred between the items the line touches. The communicative connections can include wired connections such as traces on a printed circuit board and also include wireless communication through wireless transmission of data from component to component. In some examples, the lines may also indicate an electrical connection sufficient for power to flow through the connection from one component to the other. The components in FIG. 1 showcase how the disclosed vehicle extender application interacts with the content application between a user mobile device and a vehicle head unit.

The interaction and integration of services is shown between a user mobile device 102 and a vehicle 104. As used herein a user mobile device 102 (UMD) can refer to a phone, smartphone, tablet, wearable device, or other computing device where the enables real time connectivity either directly or indirectly to remote computer servers through a cellular modem. As used herein, a vehicle 104 refers to an automobile, but can also refer to other vehicles for transporting humans including motorcycles, boats, or a bus.

The vehicle 104 includes a head unit 106 also sometimes called an automotive head unit. As used herein, the head unit 106 refers to a component providing a unified hardware interface for the system and may include screens, buttons and system controls for numerous integrated information and entertainment functions. The head unit 106 disclosed includes a terrestrial tuner 108. As used herein, a terrestrial tuner 108 is a piece of hardware used by a vehicle to detect land-based radio waves being broadcasting from a geographic location with enough strength to be detected and converted to audio data or other data. A terrestrial tuner 108 may also be known as a broadcast receiver and includes the same functionality as a broadcast receiver. As used herein, a terrestrial tuner 108 includes both mechanical and electronic tuners. An example of a terrestrial tuner 108 is a car antenna for detecting radio waves. Another example of a terrestrial tuner 108 is an antenna for detecting signals sent by a satellite. The terrestrial tuner 108 may be a separate component or may be integrated or part of the frame of the vehicle 104. Within the head unit 106 of the vehicle 104, the terrestrial tuner 108 may be managed by a terrestrial tuner application 110. In an example, the terrestrial tuner application 110 may be native to the head unit of the vehicle in that it is installed by the manufacturer of the vehicle 104 or is included at the time a manufacturer of the vehicle 104 installs the head unit 106 with the terrestrial tuner 108. The terrestrial tuner application 110 may manage specific tuning and data transfer to and from the terrestrial tuner 108. In an example, the terrestrial tuner 108 may function by receiving radio frequency (RF) transmissions like radio broadcasts and convert the selected carrier frequency and its associated bandwidth into a fixed frequency that is suitable for further processing. The signals received and converted by the terrestrial tuner 108 in conjunction with the terrestrial tuner application 110 is transmitted to a vehicle extender application 112 within the head unit of the vehicle. The vehicle extender application 112 in the head unit 106 of the vehicle 104 includes the functionality to manage the terrestrial tuner 108 data and functionality with inputs from a user on the head unit 106 as well as through the UMD 102. As used herein, the vehicle extender application 112 coordinates with a vehicle projection stack 114. As used herein, a stack such as the vehicle projection stack 114 is a set of software subsystems or components needed to create a complete platform such that no additional software is needed to support applications. Applications for vehicle projection are said to "run on" or "run on top of" the resulting platform. As used herein, a vehicle projection stack 114 refers to a platform which includes software and interfaces to enable either wired or wireless transmission of information from a UMD 102 to the head unit 106 for display, interaction, and input. The vehicle projection stack 114 may manage the initial connection between a UMD 102 and the head unit 106 as well as pass instructions, functions, or data between the head unit 106 to the UMD 102.

The vehicle projection stack 114 may connect to the UMD 102 through a UMD projection stack 116. The UMD projection stack 116 offers similar services and functionality as the vehicle projection stack 114 however for the UMD 102 and while located on the UMD 102. For example, if input is received on the head unit 106 to control an application running at least in part on the UMD 102, the UMD projection stack may receive data from the head unit 106 via the vehicle projection stack 114. The UMD projection stack may transmit this data to the UMD extender application 118 which connects the UMD projection stack 116 to a content application 120. The UMD extender application 118 may also provide a unified interface through which a user may operate a number of applications and receive and process user input that will be passed on through the UMD projection stack 116 to be projected to the head unit 106 of the vehicle 104.

The content application 120 may refer to a single application running on the UMD 102 but may refer also to a collection of applications running on the UMD 102. In an example, the content application 120 can be at least one of a music application, video playing application, online radio application, photo sharing application, mapping application, content aggregator, content streaming application, or other application for managing both local and remote content provided to the UMD 102. In an example of local content, the content application 120 may manage content stored locally on the device. In this example of local content storage, the content application 120 may communicate, control access, or request data from at least one of a multimedia manager 122, an audio manager 124, or a networking manager 126. As used herein, the multimedia manager 122 may be a file organization system, a playback software, an organization software to allow a user through the UMD 102 to access media associated with their personal credentials. The media organized by the multimedia manager 122 can be located locally on the UMD 102 or can be accessed through a cloud, server, network, or remote device system. The audio manager 124 may be an organizer for media that is audio without video. Similarly, to the multimedia manager 122, the audio manager may organize, or present media located locally on the UMD 102 or can be accessed through a cloud, server, network, or remote device system. The networking manager 126 may manage the networking capabilities of the UMD 102 whether it be through a cellular modem, through a wireless connection such as wireless internet, device to device communications, or near field communications, among others. This can include negotiating initial connection, organizing communications, and terminating connections as specified by the UMD 102.

Figure 2:
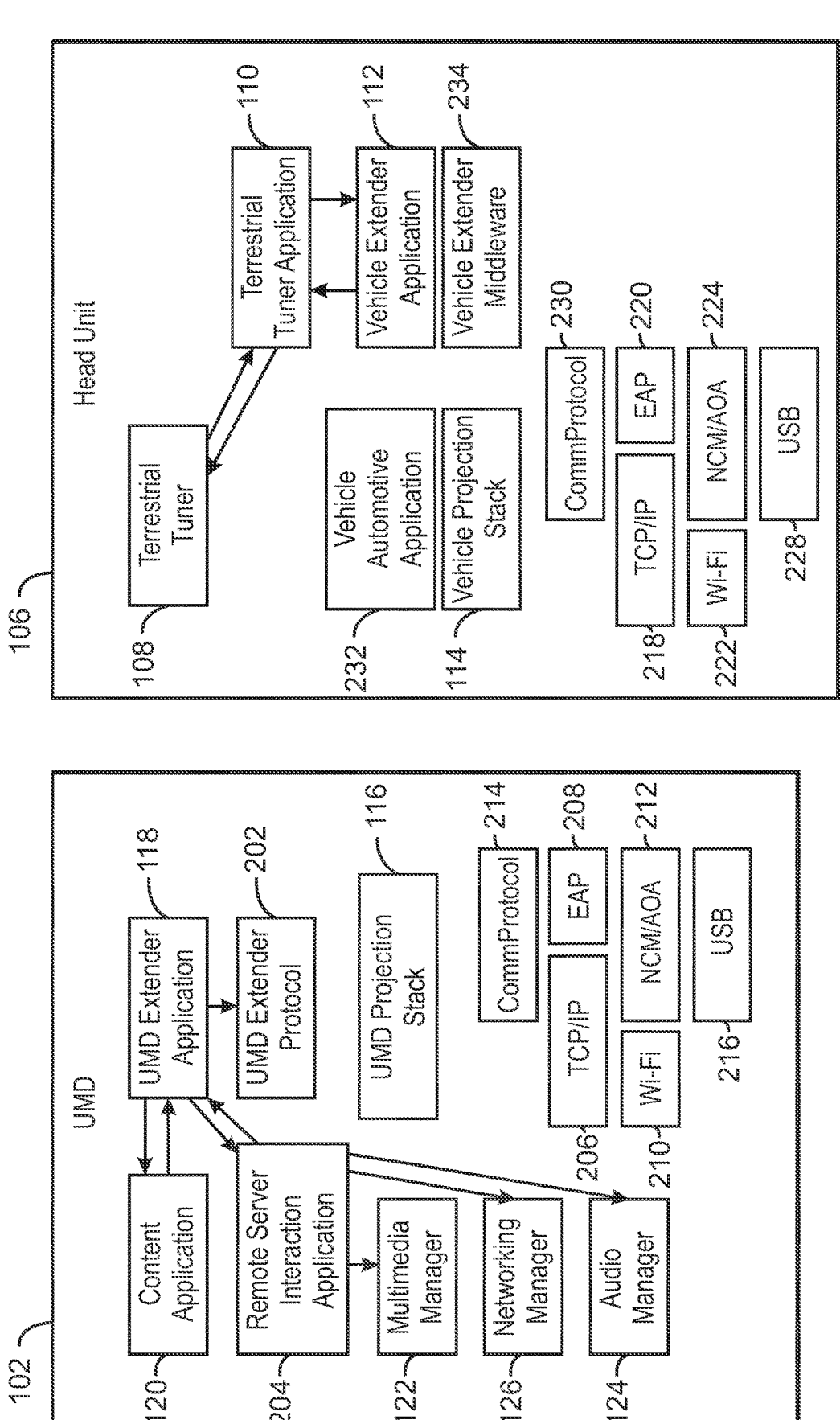
FIG. 2 is a schematic diagram of an example system for integrating a terrestrial tuner into a projection mode of a user mobile device.

FIG. 2 is a schematic diagram of an example system 200 for integrating a terrestrial tuner into a projection mode of a user mobile device. Like numbered items are as they are described with respect to FIG. 1. Arrows drawn between items indicate a direction of data flow through a communicative channel between the two items connected. These communicative connections may be made by wired or wireless connections. The data flow indicated is not the only data flow between these applications and many other components shown may be interconnected, the present data flow is shown to show one example of the present techniques.

The UMD extender application 118 communicates information to the content application 120 and also receives content data from the content application 120. The nature of this exchange is dictated by the UMD extender protocol 202. In an example the UMD extender protocol 202 may be incorporated into the same stack as the UMD extender application 118 or may be stored and operated separately within the UMD 102. Depending on the operating system (OS) of the UMD 102, the UMD extender protocol 202 would correspond to the particular OS run by the UMD 102. In part, the UMD extender protocol 202 ensures the UMD extender application 118 is able to operate with at least the UMD extender application 118, the content application 120, the remote server interaction application 204, and the OS of the UMD 102. As used herein, the remote server interaction application 204 includes the ability for the UMD 102 through the UMD extender application to access remote servers. Remote servers may include general uniform resource locator (URL) links, and remote servers may include general internet access. In an example, the remote server interaction application 204 may enable communication with password or token accessible servers for access to content. In an example, a user may have access to a content service via a membership with the content provider or their distributors. In this example, the content application 120 may grant the UMD 102 access to content from the content application through the remote server interaction application 204. The remote server interaction application 204 may retrieve media and store it in the UMD 102 through a multimedia manager 122.

Depending on the particular hardware, operating system, and configuration of the UMD 102 there may be a number of communication modules present. For example, the UMD 102 may include a Transmission Control Protocol (TCP) and Internet Protocol, commonly known as TCP/IP as a TCP/IP element 206. The TCP/IP element may manage communications following the communication protocols outlined by these respective standards for the UMD 102. The UMD 102 may include External Accessory Protocol (EAP) communications through an EAP element 208 which may enable connection through Universal Serial Bus (USB) ports. In an example, the EAP element 208 may enable an application or hardware components to communicate with external hardware. In an example, the EAP may enable communication regardless of hardware connection including at least one of an iOS-based device connected through an Apple Lightning or 30-pin connector, or wirelessly through Bluetooth. In this example, iOS and Apple Lightning refers to trademarks from Apple Corporation. Bluetooth refers to a connection enabled by the protocols and hardware generally encompassing wireless device to device communications, but additionally the specific communications enabled by the Bluetooth protocol, where Bluetooth is a registered trademark of Bluetooth Sig Corporation.

The UMD 102 may include a Wi-Fi element 210, where Wi-Fi is a registered trademark of the Wi-Fi Alliance and relates to wireless networking technologies based on the IEEE 802.11 family of standards. The UMD 102 may include a Network Configuration Manager (NCM) and AOA components in an NCM/AOA element 212. The NCM/AOA element 212 may enable the UMD 102 to manage configurations on heterogeneous, multi-vendor networks. The NCM/AOA element 212 may provide a single point of management for routers, switches, firewalls, load balancers, and wireless access points. The UMD 102 may include a communication protocol element 214 that corresponds to the particular UMD 102 device hardware or corresponds to the operating system of the UMD 102. For example, the communication protocol element 214 for one phone may be following an iPod Accessor Protocol (iAP2), where iPod is a registered trademark of Apple Corporation. In another example the communication protocol element 214 could be for Android Open Accessory (AOA) which is an accessory to allows external USB hardware (Android USB accessories) to interact with Android-powered devices in accessory mode. Android is a registered trademark of Google Limited Liability Corporation. The communication protocol element 214 could also be used to correspond with communication specifications outside of these two protocols as well. The UMD 102 may also include a USB port 216. The USB port 216 may follow any of the specifications for a hardware connection point between devices including USB Type A or USB Type C connections.

The head unit 106 may include corresponding devices as the UMD 102 to operate in similar ways for the vehicle. For example, the head unit 106 may include a TCP/IP element 218, an EAP element 220, a Wi-Fi element 222, an NCM/AOA element 224, a USB element 228, and a comm protocol element 230. These elements may function in similar ways as indicated above for the UMD 102, however in this case, the elements would function on behalf of the head unit 106 of the vehicle 104.

Additionally, the head unit 106 may include the vehicle automotive application 232 which may provide an interface for the user to access and control both existing multimedia and applications on the head unit, but additionally, allows a user to interact with applications projected to the head unit 106 from the UMD 102 that include terrestrial tuner 108 functionality or access to the terrestrial tuner 108. Including both existing head unit functionality for media access together with user management and access to applications interacting with the terrestrial tuner improves the head unit device by reducing the number of interfaces needed to operate an increased array of features. Further, the reduction in the number of interfaces also reduces the time to operate multiple features on the head unit.

One aspect of the vehicle automotive application 232 accessing the terrestrial tuner is providing the vehicle automotive application 232 to the terrestrial tuner 108 through a vehicle extender application 112. This vehicle extender application 112 may be operating using vehicle extender middleware 234 corresponding to the type of terrestrial tuner or frequencies being accessed by the terrestrial tuner 108. In an example, the vehicle extender middleware 234 may correspond to at least one of FM frequency interpretation and instructions, AM frequency interpretation and instructions, DAB or DRM interpretation and instructions, or satellite interpretation and instructions. As seen in the example system 200 of FIG. 2, the terrestrial tuner 108 may receive and provide data to the terrestrial tuner application 110. In an example, the terrestrial tuner application 110 may operate using instructions that indicate the type of signal the terrestrial tuner 108 may be instructed to detect. Further the information sent to the terrestrial tuner 108 and to be passed to the vehicle automotive application 232 maybe managed and instructed by a vehicle extender application 112. In an example, a unique vehicle extender application 112 may be used for each type of frequency, programming, and information will be managed or merged with information provide by the terrestrial tuner 108.

Using the indicated configurations, the UMD 102 may leverage existing projection mode capabilities enable d by the UMD projection stack 116 working with the vehicle projection stack 114 to provide functionality to a vehicle automotive application 232. The communication options leveraged in this projection mode may make use of existing ports and protocols as discussed above, plus the improvement of incorporating functionality from the terrestrial tuner 108 of the head unit 106 of the vehicle 104.

Figure 3:
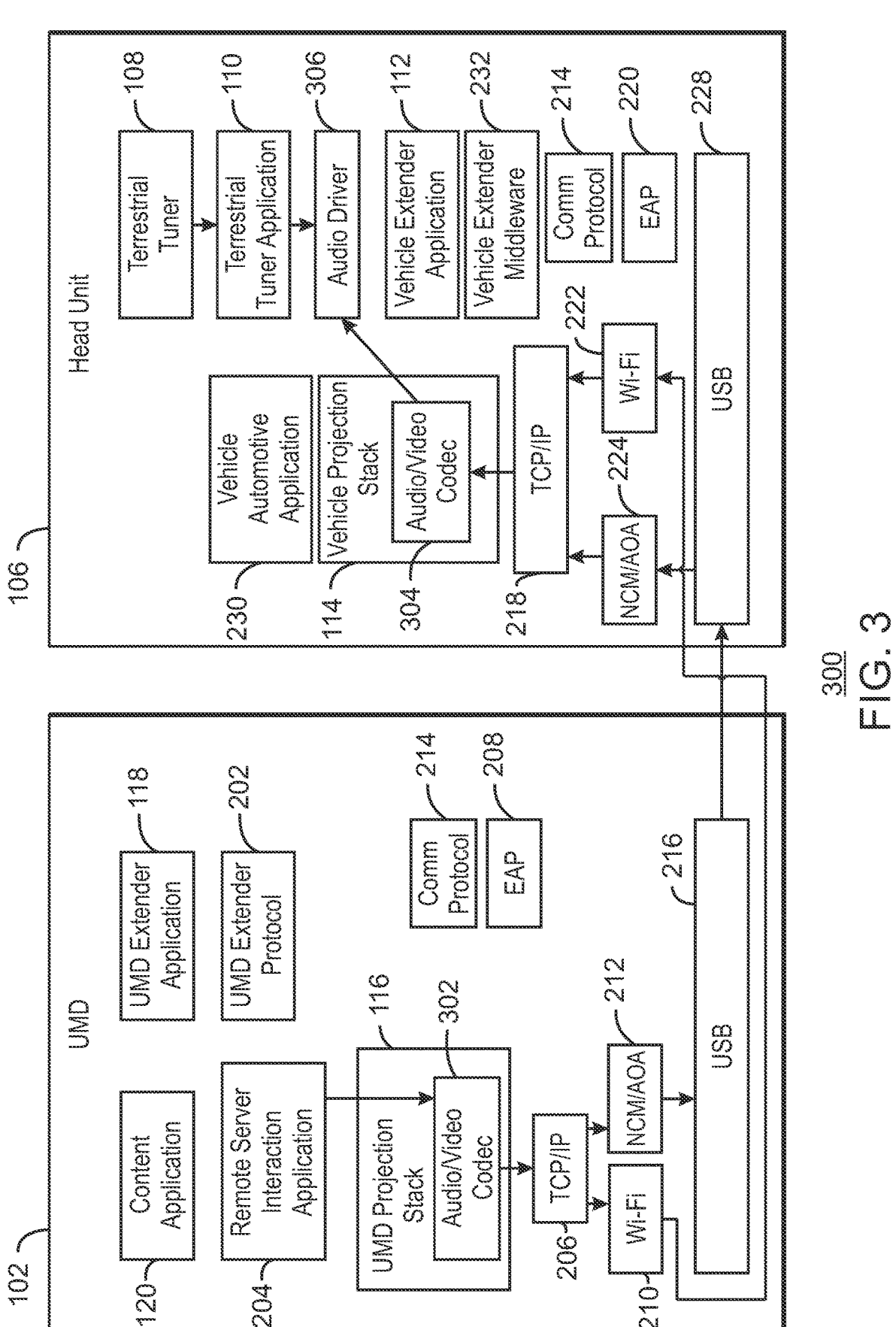
FIG. 3 is a schematic diagram of an example system for integrating a terrestrial tuner into a projection mode of a user mobile device with audio encoding.

FIG. 3 is a schematic diagram of an example system 300 for integrating a terrestrial tuner into a projection mode of a user mobile device with audio encoding. The example system is presented as an architecture diagram for a terrestrial tuner projection mode. The architectural diagram shows, at least in part, the stacks on a UMD 102 and head unit 106 related to a projection mode for software on the device to interact with the head unit 106 and the terrestrial tuner. In an example, an audio signal flows between the UMD 102 and the head unit 106 of the vehicle 104 for AM radio. In an example, an audio signal flows between the UMD 102 and the head unit 106 of the vehicle 104 for FM radio. In an example, an audio signal flows between the UMD 102 and the head unit 106 of the vehicle 104 for DAB radio. In an example, an audio signal flows between the UMD 102 and the head unit 106 of the vehicle 104 for HD radio. In an example, an audio signal flows between the UMD 102 and the head unit 106 of the vehicle 104 for SXM radio.

The example system 300 includes a UMD projection stack 116 that includes an Audio/Video Codec 302. The Audio/Video Codec 302 can be an encoder for audio, video, or other media formats. The remote server interaction application 204 may provide media to the Audio/Video Codec 302 in the UMD projection stack 116. The data from remote server interaction application 204 may be encoded using a codec or into a format or following specific settings to that it can be provided to the head unit 106 for decoding in the Audio/Video Codec 304. The Audio/Video Codec 304 can be a decoder for audio, video, or other media formats. Once the audio data is decoded in the head unit 106, the audio may be provided to the audio driver 306 in the head unit 106 which may drive the playing on audio in the vehicle housing the head unit 106.

Once encoded in the Audio/Video Codec 302, the data may be transmitted to the head unit 106 for decoding using at least one of a number of elements and components. In the example system 300, the data may be provided to the head unit through the TCP/IP element 206 and either connected through Wi-Fi element 210 to the Wi-Fi element 222 in the head unit 106. In an example, the encoded data may be sent using the TCP/IP element 206, the NCM/AOA element 212, and the USB element 216. The USB element 216 may connect to the USB element 228 in the head unit 106. In the head unit the encoded data from the UMD 102 can be passed by the NCM/AOA element 224 through TCP/IP element 218 to the Audio/Video Codec 304 in the vehicle projection stack 114.

Figure 4:
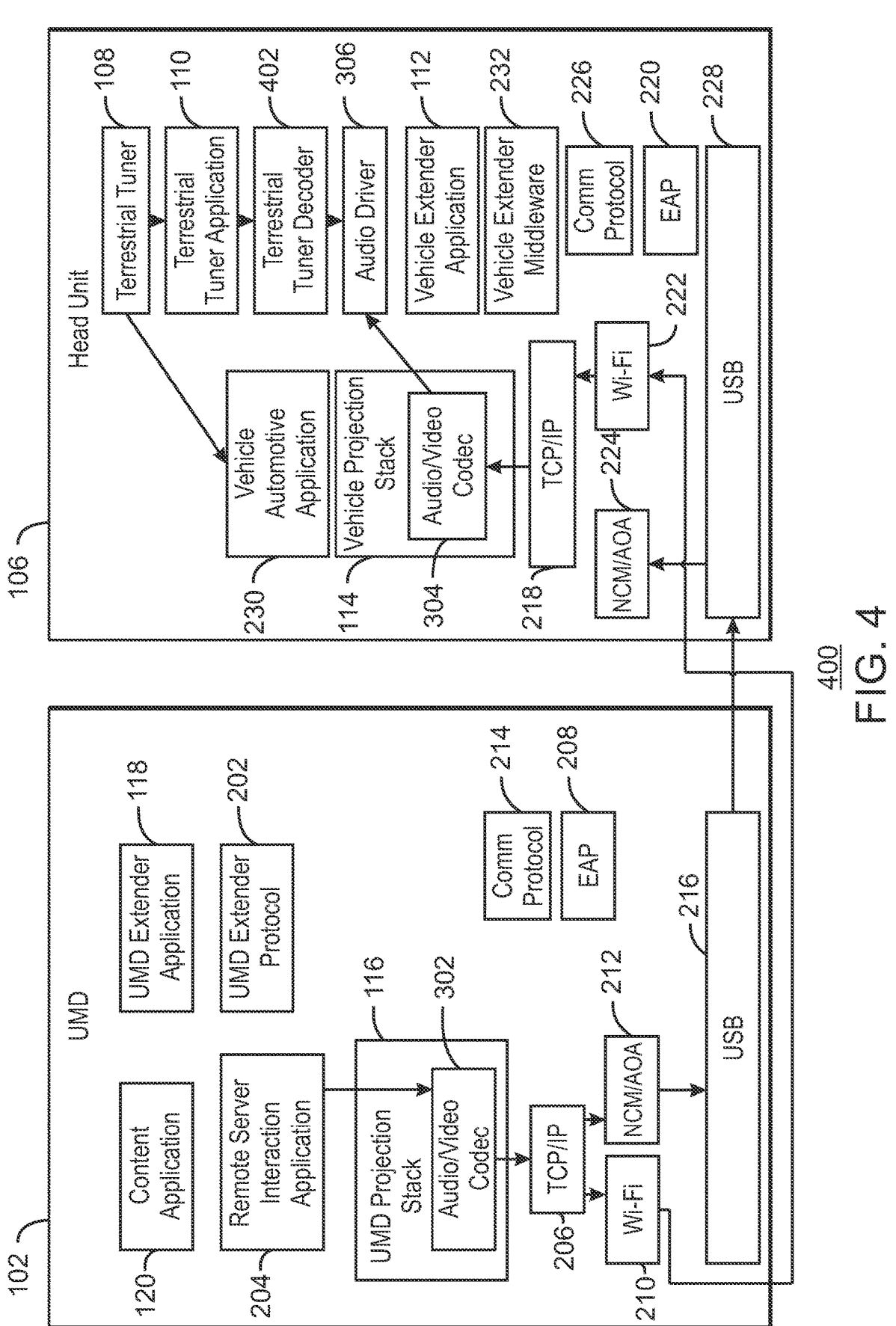
FIG. 4 is a schematic diagram of an example system for integrating a terrestrial tuner into a projection mode of a user mobile device with terrestrial tuner decoding.

FIG. 4 is a schematic diagram of an example system 400 for integrating a terrestrial tuner 108 into a projection mode of a user mobile device 102 with terrestrial tuner decoding. The example system 400 may include a UMD projection stack 116 that communicates to the Vehicle projection stack 114 through a projection mode. As used herein, projection mode may include the transmission of data to the head unit 106, where the data is obtained through applications on the UMD 102 requiring the UMD user authorization for access to the data. The projection stack 114 on the head unit 106 may arbitrate how the audio signal flow between the user mobile device and the vehicle head unit for AM/FM/HD, DRM and DAB or other input from the terrestrial tuner 108.

For example, the vehicle projection stack 114 may direct the audio driver 306 to play one of the two medias provided by the terrestrial tuner 108 or the Audio/Video Codec 304. In an example the information received at the terrestrial tuner 108 can be converted to a digital signal and provided to the audio driver 306 by the terrestrial tuner application 110. The terrestrial tuner 108 may also provide a signal to the vehicle automotive application 232. The vehicle automotive application 232 may choose to instruct the audio driver 306 to project sound from one source over another, e.g., either the terrestrial tuner 108 or from data received from the UMD 102. The decision by the vehicle projection stack 114 for the audio driver 306 may be based on data quality, energy cost to provide data from one source over another, licensing cost to play a piece of media from one source over another, or another metric to decide between one data source or another.

Figure 5:
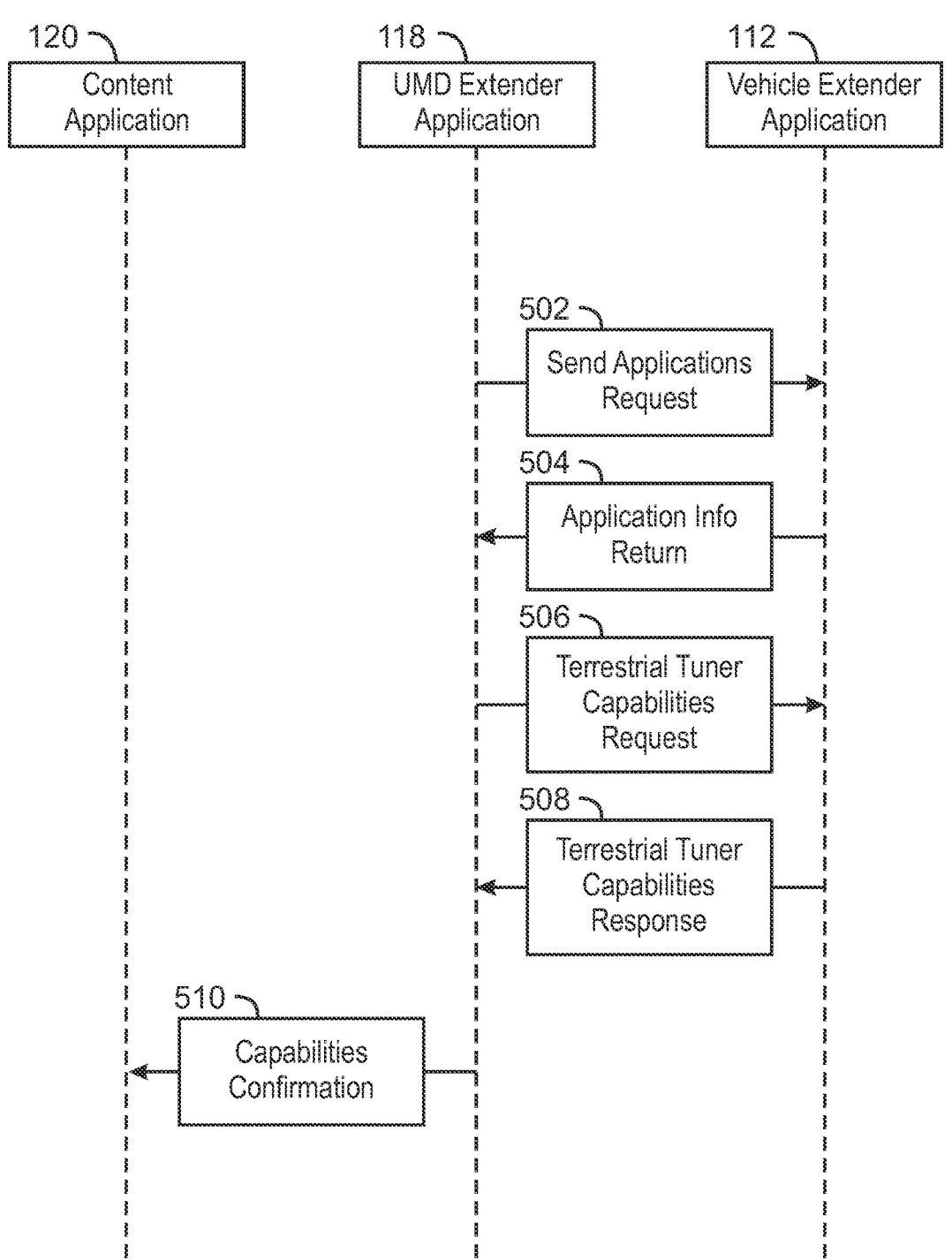
FIG. 5 is a timing diagram of an example system for integrating a terrestrial tuner into a projection mode of a user mobile device.

FIG. 5 is a timing diagram of an example method 500 for integrating a terrestrial tuner into a projection mode of a user mobile device 102. The example method 500 shows an initial communication between a user mobile device 102 and head unit 106 to allow the UMD extender application 118 know the capability of the head unit 106 and more particularly the vehicle extender application 112 so that these capabilities can be communicated to the content application 120.

The example method 500 begins when the UMD extender application 118 sends an applications request 502 to the vehicle extender application 112. This request 502 may be sent through a wireless connection or a physical port connecting the UMD 102 and the head unit 106. The vehicle extender application 112 may then return application information 504 to the UMD extender application. The UMD extender application 118 may then send a terrestrial tuner capabilities request 506 to the vehicle extender application.

This capabilities request includes the types of broadcasts the terrestrial tuner may be able to provide, for example, AM/FM/HD, DRM, DAB, SXM. The vehicle extender application 112 may provide the UMD extender application 118 a response including the terrestrial tuner capabilities 506. The UMD extender application 118 may then provide a capabilities confirmation to the content application 120. In this method 500 the content application may provide and manage media from a cloud server accessed through the UMD 102.

In an example, the handshake between the UMD extender application 118 and the vehicle extender application 112 can also include the exchange of protocol identification in order to confirm the current version by each and enable version control. Through this exchange of versioning information, the vehicle extender application 112 may can also use this communication with the UMD extender application 118 to allow for new upgrades in protocol format through feature addition and to align internal operation of the head unit 106 to maintain these features and versions consistently. The step shown in example method 500 can be included or implemented through the UMD projection stack 116 and vehicle projection stack 114 and establish the channels and elements that may be involved with how the audio signal may flow between the UMD 102 and the head unit 106 for AM/FM/HD, DRM and DAB.

Figure 6:
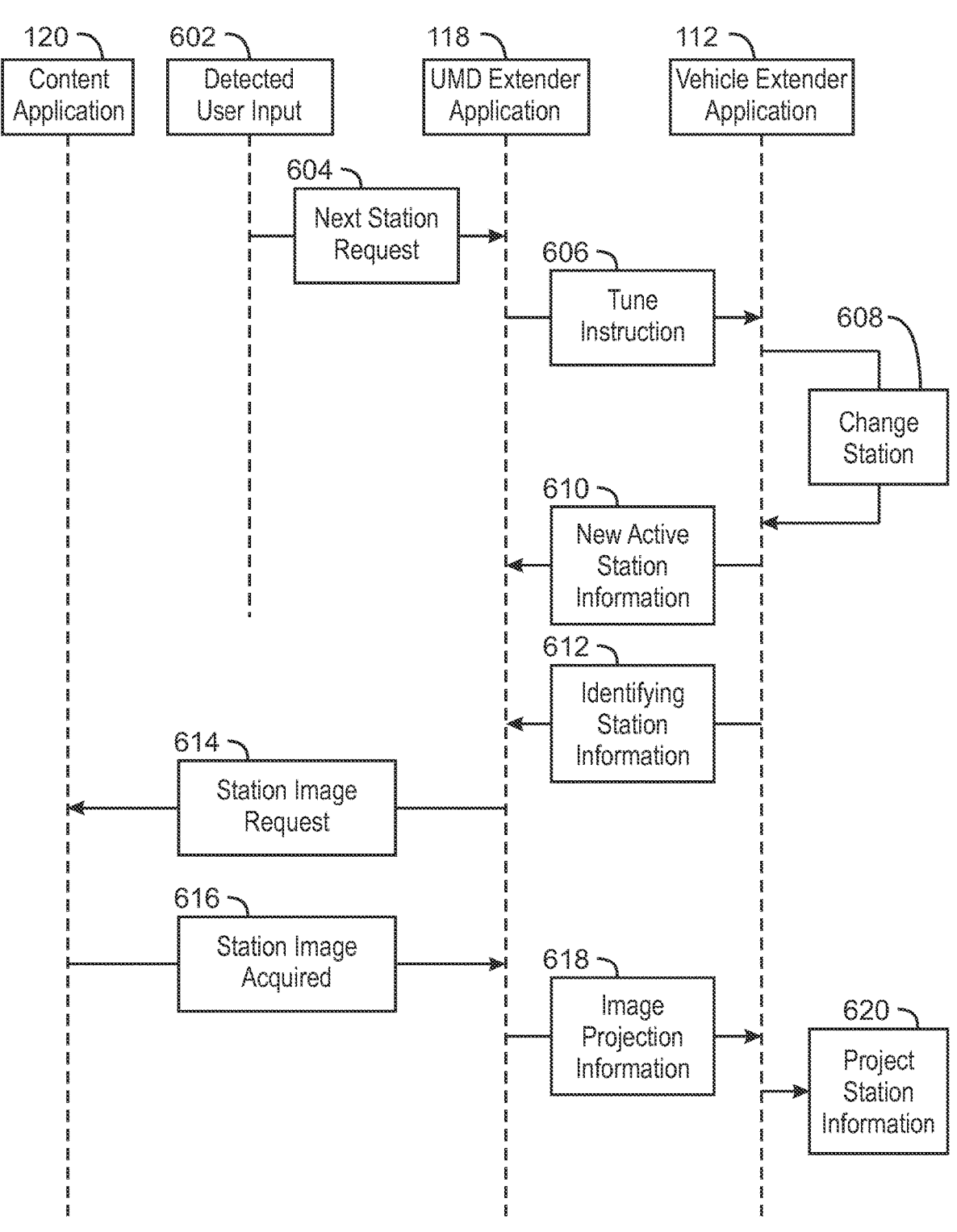
FIG. 6 is a timing diagram of an example system for operation of an integrated system of a terrestrial tuner and user mobile device operating in a projection mode.

FIG. 6 is a timing diagram of an example method 600 for operation of an integrated system of a terrestrial tuner 108 and user mobile device 102 operating in a projection mode. This example provides an example of a content application 120 providing supplemental data through a UMD 102 to be displayed on a head unit 106 while the audio signal being played on the head unit 106 was received from the terrestrial tuner of the head unit 106. For example, the information can be station information corresponding to the audio signal the terrestrial tuner is receiving, the song and imagery associated with the song, a radio talk show host name or the name of a show, or a website or social media pages associated with the artist, album or song so that a user may learn more about an artist they are hearing from audio signal received through the terrestrial tuner 108.

In an inciting action, the UMD extender application 118 receives request 604 as indicated by a detected user input 602. In an example, this request 604 is a request for the UMD 102 to play a different radio station from the terrestrial tuner on the vehicle 104 through the head unit 106. The detected user input 602 is a user action detected on the UMD 102. The detection may be through a touch screen, voice command, gesture, or other input method of the UMD 102. In response to receiving the request via detected user input 602, the UMD extender application 118 sends an instruction to the vehicle extender application 112. In an example, the instruction may be to tune for a specific station with the terrestrial tuner for an audio stream the terrestrial tuner can detect. The vehicle extender application 112 may instruct the terrestrial tuner in accordance to the received instruction. In an example, the vehicle extender application 112 may change the station of the terrestrial tuner in response to a tune instruction 606 received from the UMD extender application 118.

Once an instruction is made by the vehicle extender application 112, the completion of this instruction may result in a notification provided to the vehicle extender application 112 that of the completion of the task. The vehicle extender application 112 may then update state or status information it is storing and provide any updates to the UMD extender application. For example, the update of state or status may include delivery of net active station information 610 and/or identifying station information 612. In response to receiving updated information from the vehicle extender application 112, the UMD extender application 118 may make a request to the content application 120 to provide supplementary content that can accompany and correspond to what is being played on the head unit. For example, the UMD extender application 118 may make a station image request 614 to the content application 120 that may provide images to accompany stations broadcasting audio. This request may be sent to the content application 120 each time the UMD extender application 118 receives updated information about an active station or the identification information for a particular station. The content application 120 may respond with the supplementary information, for example, the station image acquired 616, to the UMD extender application 118. If the UMD extender application 118 receives supplementary information, such as a station image, the UMD extender application 118 may send the supplementary information to the vehicle extender application 112. In an example, the information may be supplemental information the UMD extender application 118 receives from the content application 120 such as station image. Thus, in an example, the UMD extender application 118 may provide image projection information 618 to the vehicle extender application 112. In response to receiving supplementary information corresponding to the signal received from the terrestrial tuner 108, the vehicle extender application 112 may also project the supplementary information, for example, projecting station information 620 like an image corresponding to the currently playing station detected from the terrestrial tuner 108. In this way, supplementary information retrieved through a UMD 102 may be provided to a head unit 106 to display while audio information received from a terrestrial tuner 108 is also played.

Figure 7:
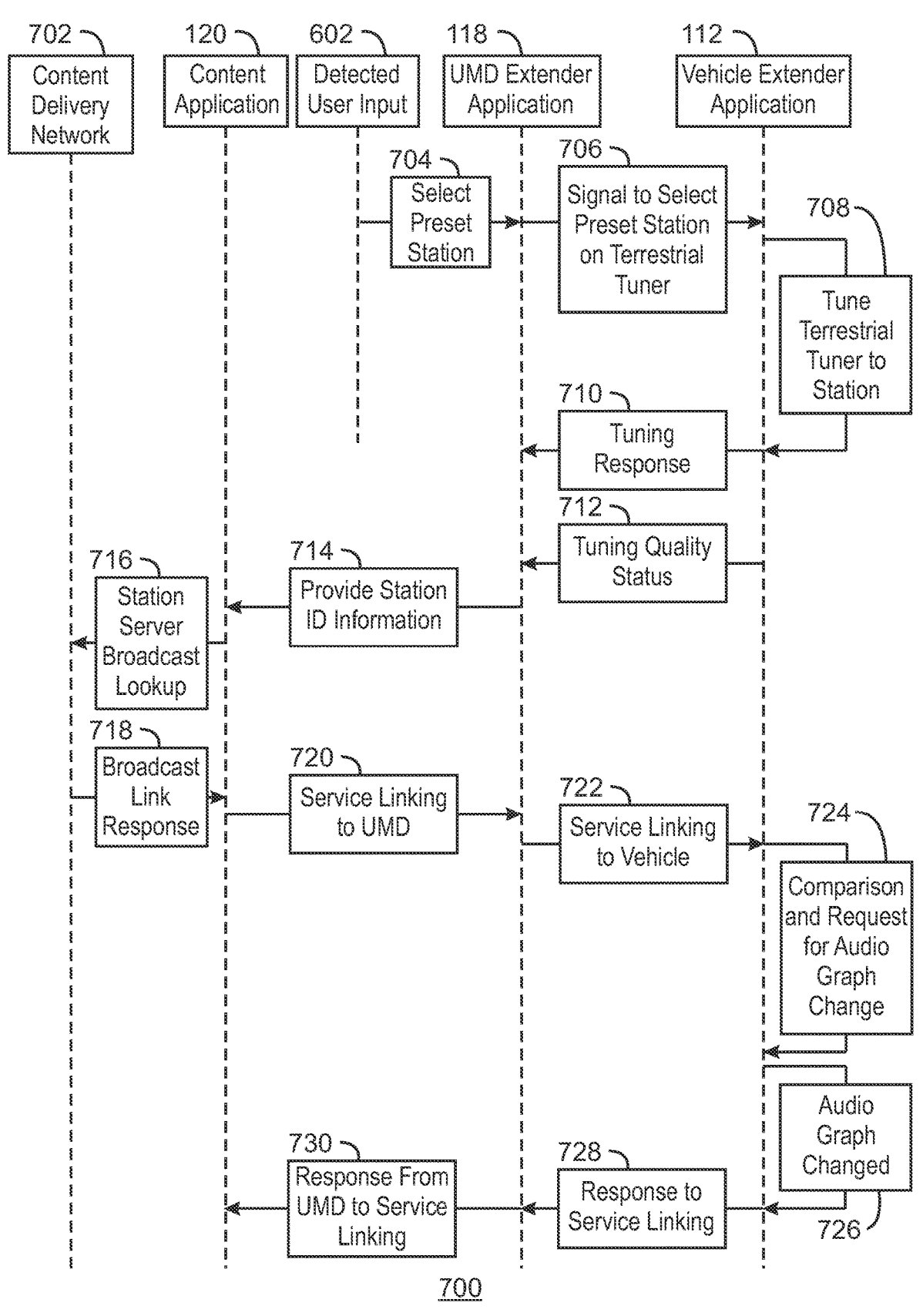
FIG. 7 is a timing diagram of an example system for switching between receiver sources with an integrated system of a terrestrial tuner and data from a user mobile device.

FIG. 7 is a timing diagram of an example method 700 for switching between receiver sources with an integrated system of a terrestrial tuner 108 and data from a user mobile device 102. In this example, a user may be able to experience content following with FM to internet in which they may tune to an FM station in a first location, switch to the internet providing the same audio stream via a cellular modem in the UMD 102 as the user travels out of range of the FM station in the first location. In this example, the content application 120 may interact with a content delivery network 702 in order to provide primary or supplemental information for a station requested by a user. The example method 700 may begin when a UMD extender application 118 receives a selection from a user, such as a user selection for a preset station 704. The station preset may be for a terrestrial tuner station and the preset may be stored in the UMD 102 even when the UMD 102 cannot access the station without the terrestrial tuner 108. In an example, user interaction occurs on or with the UMD 102 rather than the head unit 106. The UMD extender application 118 signals the vehicle extender application 112 based on the user input, for example, a signal to select a preset station on the terrestrial tuner 706. The vehicle extender application 112 may act on the instructions, for example, tuning the terrestrial tuner to a station instructed. Once the action has been completed, the vehicle extender application 112 may receive a notification and provide a response to the UMD extender application 118. For example, the response to the UMD extender application 118 from the vehicle extender application 112 can be a tuning response 710 indicating the tuning to a specified station has completed. The response to the UMD extender application 118 from the vehicle extender application 112 can be a tuning quality status 712 indicating the quality of the audio signal being received for a specified station from the terrestrial tuner 108. The UMD extender application 118 may use received information about the station being played on the head unit 106 and provide that information to a content application 120 installed locally on the UMD. In an example, the UMD extender application 118 may provide station ID information 714 to the content application 120. The content application 120 may not have requested information locally, but may use the UMD 102 hardware to connect to a content delivery network 702 that is remote and physically distinct from the UMD 102. The content application 120 may use provided information to send the content delivery network 702 information as well as requests. In an example, the content application 120 may provide the content delivery network 702 with a station server broadcast lookup 716 request in order to lookup the broadcast information for a particular station. In response, the content delivery network 702 may obtain information and return it to the content application 120. In an example, the content delivery network 702 may provide a broadcast link response 718 corresponding to a particular station ID received from the content application 120. In an example that the broadcast link response 718 may be an internet protocol address in the format of a URL. In an example, the URL links may be Hypertext Transfer Protocol Secure (HTTPS) to ensure scalable security of broadcast links provided to vehicles. In an example, the content application 120, the UMD extender application 118, and the vehicle extender application 112 may prohibit broadcast or transferal of links that are Hypertext Transfer Protocol (HTTP) rather than an encrypted or secure format for broadcast links.

The content application 120 may provide service liking to the UMD 720, for example, by proving a broadcast link to the UMD extender application 118. The UMD extender application 118 may provide service linking to the vehicle 722 by, for example, providing a broadcast link to the vehicle extender application 112. The vehicle extender application 112 may request arbitration from the vehicle projection stack 114 with regard to the audio quality of a station from a terrestrial tuner in comparison to the broadcast received via service linking. In this example, the vehicle extender application 112 may make a comparison of these formats and request for an audio graph change 724. In an example, the audio graph change can include a change in the audio provided and played by the audio driver in the vehicle. The vehicle extender application 112 may also receive and confirmation once an action has been undertaken, for example, and audio graph change 726. In response such a notification, the vehicle extender application 112 may provide a response to the UMD extender application 118 providing a response to service linking 728. In an example, the response may be a confirmation that the service linking was successful or by contrast, not utilized by the vehicle, or alternatively ruled to be lower quality for a particular location based on the location by the vehicle at the time arbitration favored signal from the terrestrial tuner 108. Based on the information received by the UMD extender application 118, a response from the UMD to service linking 730 may be sent to the content application 120. As before, this response to the content application 120 may be a confirmation that the service linking was successful or by contrast, not utilized by the vehicle, or alternatively ruled to be lower quality for a particular location based on the location by the vehicle at the time arbitration favored signal from the terrestrial tuner 108.

In an example, the vehicle extender application 112 may switch from AM, FM, HD or other terrestrial signals to internet audio utilizing the end user mobile device subscription plan when the terrestrial signal fades away. In an example the adjustment of signal based on location may be known as content following, with shifting between internet audio and terrestrial audio adjustable by the vehicle extender application 112. For example, if an internet broadcast signal fades away or if content app provider decides to switch to the terrestrial broadcast, this may be managed with a similar sequence to initiate the sequence even without detected user input 602. In an example, royalty payment to content creators may vary based on the method of delivery to an end user. For example, delivery via internet radio may have a first cost in royalties to be paid to content creators and delivery via terrestrial tuner 108 may have a second cost in royalties to be paid to content creators. The vehicle extender application 112 may manage switching between audio signal providers based on a lowest incurred royalty cost for proving the same media via the cheaper means. In an example, the content application 120 can utilize a global positioning system (GPS) of the UMD 102 in order to obtain the current location of the device while the UMD is connected to the head unit of the vehicle. When the content application 120 has access the device location via the GPS, the location may be cross referenced with nearby station playlist information in order for the content application 120 to obtain station information on the terrestrial band played by the vehicle. The content application 120 may then request the vehicle tune to the particular broadcast via a DNS lookup or other suitable broadcast link identification method.

In an example, any switch from audio signal sources to another can also include an audio quality check including a minimum quality threshold before switching to an audio content source. With regard to terrestrial tuner strength, for example, AM signal may be measured by field strength with an S meter. AM signal may also be assessed based on offset error or adjacent channel energy from the terrestrial tuner to be used as a gauge to confirm on audio quality. In an example where tuner strength is being assessed for FM signal, this may include field strength, frequency offset, or also multipath and adjacent channel energy from the terrestrial tuner as a gauge to confirm on audio quality. Other signal sources may use other measures for audio quality assessment. For example, for SXM radio signal detected by a terrestrial tuner, audio quality may take into account signal loss conditions between terrestrial tuner and user mobile device. The subscription to a particular SXM station or package may also be conducted to ensure the indicated station is tunable on the terrestrial satellite tuner before the audio arbitration and source switch is initiated.

Figure 8:
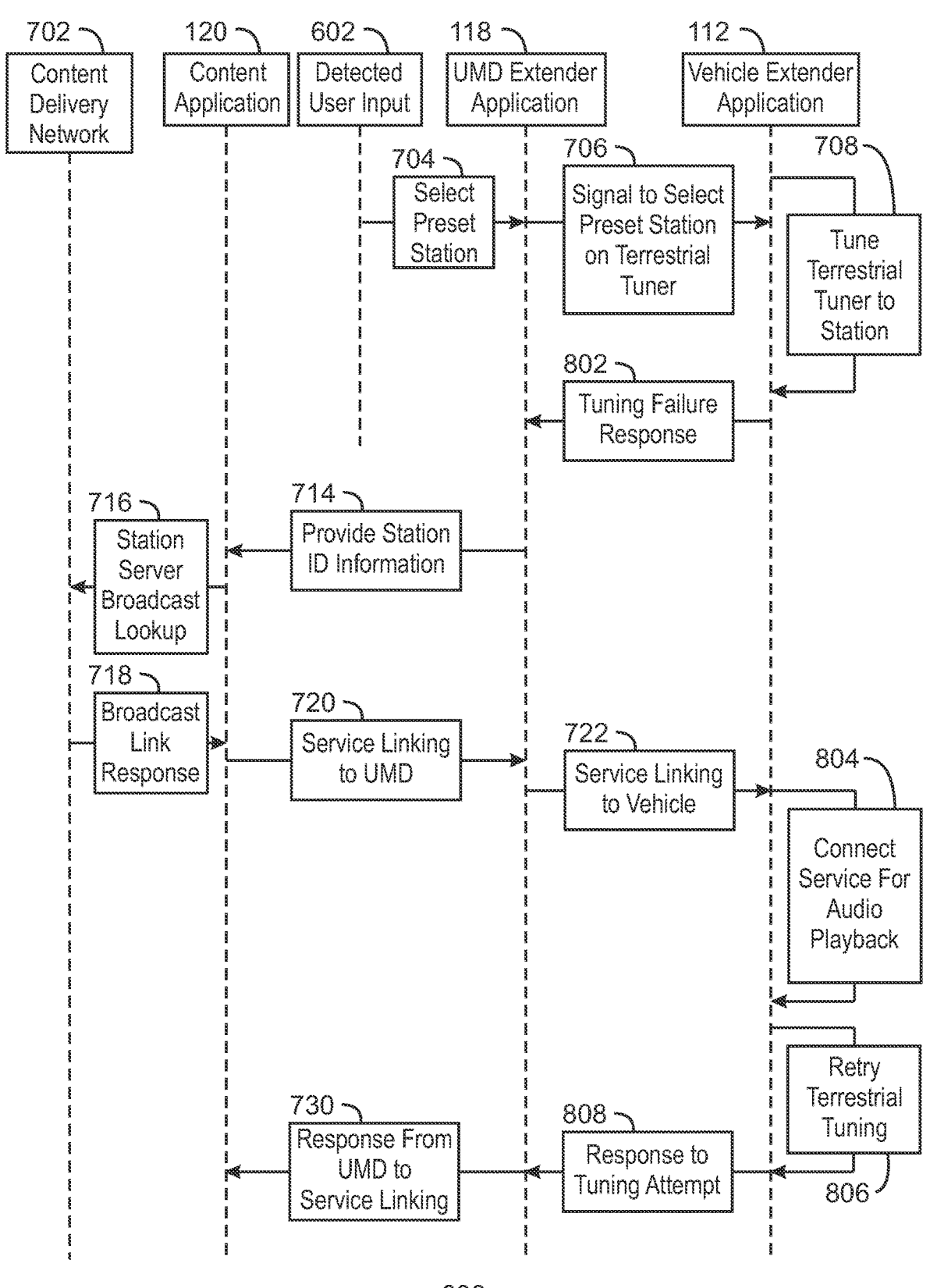
FIG. 8 is a timing diagram of an example system handling a terrestrial tuning failure with data from a user mobile device.

FIG. 8 is a timing diagram of an example system 800 handling a terrestrial tuning failure with data from a user mobile device 102. Like numbered items are as described with respect to FIGS. 1, 6, and 7. The example system 800 may provide an example on the system handling an internet audio linking failure case. For example, the terrestrial broadcast signal may begin to fade away and, in an attempt, to switch between terrestrial and internet station, the attempt may fail. Failure for internet radio may be attributed to at least a cloud server HTTP 404 error or other networking or subscription issue.

For example, a problem may first arise if a terrestrial tuner signal begins to fade. When a terrestrial tuner signal being, to fade, the vehicle extender application 112 may provide an indication to the UMD extender application 118 by a tuning failure response 802. This result may be handled via the UMD extender application 118 providing station information to a content application 120 in the event that the station can be identified and linked for internet audio playback by the head unit. However, in an example, the internet audio link provided to the vehicle extender application 112 may be attempted. In an example, the vehicle extender application 112 may attempt to connect service for audio playback for the head unit 106. However, the vehicle extender application 112 may receive a notification that the attempt to connect has filed. In response to receiving a failure notification after attempting to connect to the internet audio, the vehicle extender application 112 may retry terrestrial tuning 806 in the event that the vehicle has returned in range of the terrestrial tuner. In an example, the retry attempt is successful and the process may terminate. In another example, the retry attempt to connect to the terrestrial audio is not successful and the vehicle extender application 112 may provide a response to the tuning attempt 808 to the UMD extender application 118. Based on this information, the UMD extender application 118 may provide additional information regarding the service linking to the content application. In an example, the content application 120 may search for an alternative service link to attempt the process of connecting to internet audio a second time or recursively until a satisfactory link is found, terrestrial signal is regained, or internet audio link options are exhausted.

Figure 9:
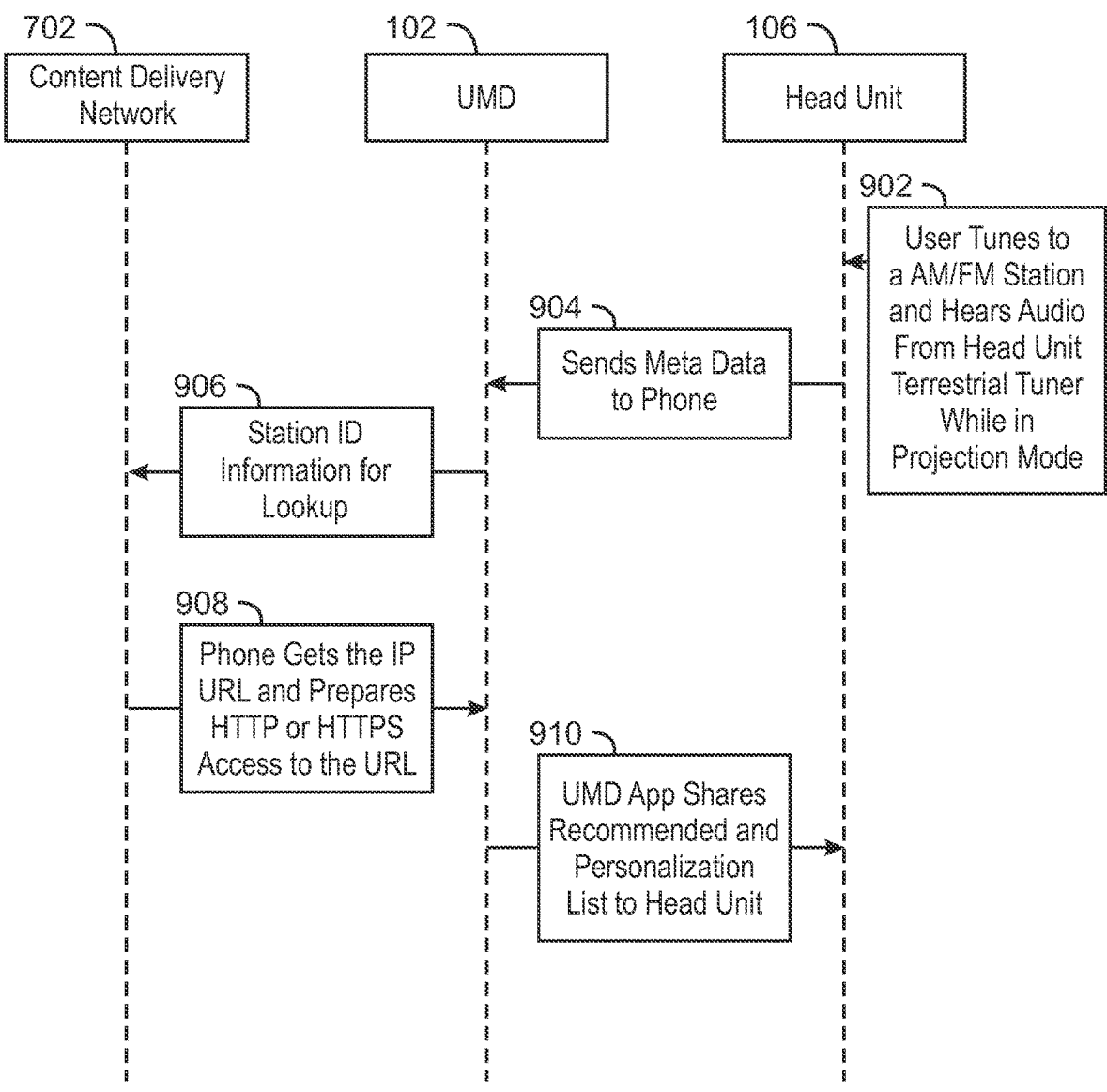
FIG. 9 is a timing diagram of an example system for identifying meta data from terrestrial tuner station to user mobile device for integration with applications on the user mobile device.

FIG. 9 is a timing diagram of an example system 900 for identifying meta data from terrestrial tuner station to user mobile device 102 for integration with applications on the user mobile device 102. Like numbered items are as described with regard to FIGS. 1 and 7.

At the head unit 106, a user may tune to an AF/FM station and hear audio from the head unit through a terrestrial tuner while in a projection mode with a UMD 102. The head unit 106 may provide meta data about the audio received through the terrestrial tuner to the UMD 102. The UMD 102 may provide meta data to the content delivery network 702 to potentially aid in identifying the broadcast based on the meta data provided. In an example, the meta data may be time of broadcast, station ID, frequency, and may be combined with GPS coordinates on the UMD 102. The UMD 102 may provide the station ID information for lookup 906 to the content delivery network 702. The content delivery network 702 may be able to identify a broadcast station. In response, the UMD may get the IP URL and prepare HTTPS access to the URL 908. Included in the response to the UMD 102 may be information to enable a content application on the UMD to find recommendations and personalization to a user. Accordingly, the UMD 102 may use the UMD application to share recommended and personalization list to the head unit 106 for display or integration with terrestrial tuner audio signals being played on the head unit 106.

In an example, the content metadata and user experience enhancement may be shared between a terrestrial tuner 108 and user mobile device 102 in projection mode. Information from the terrestrial tuner and UMD 102 may be provided to a cloud server to aid the content application and an account stored in the cloud server identify and recognize user behavior. Using this recognition, the cloud server may provide related on demand content to the user for listening based on music identified from the terrestrial tuner selected by the user. For example, a content application in the UMD 102 can utilize the listening preference of the user, with regard to audio signal selected including a terrestrial tuner. The content application 120 of the UMD 102 may create recommended content such as podcast and/or recommendations and share these recommendations back to the UMD 102 to provide to the end user. This meta data content may be used regardless of it is derived from a terrestrial tuner for AM/FM/HD, DAB, DRM, or SXM radio signals. No matter the origin, the data may be used on the UMD 102 through the vehicle extender application 112.

Figure 10:
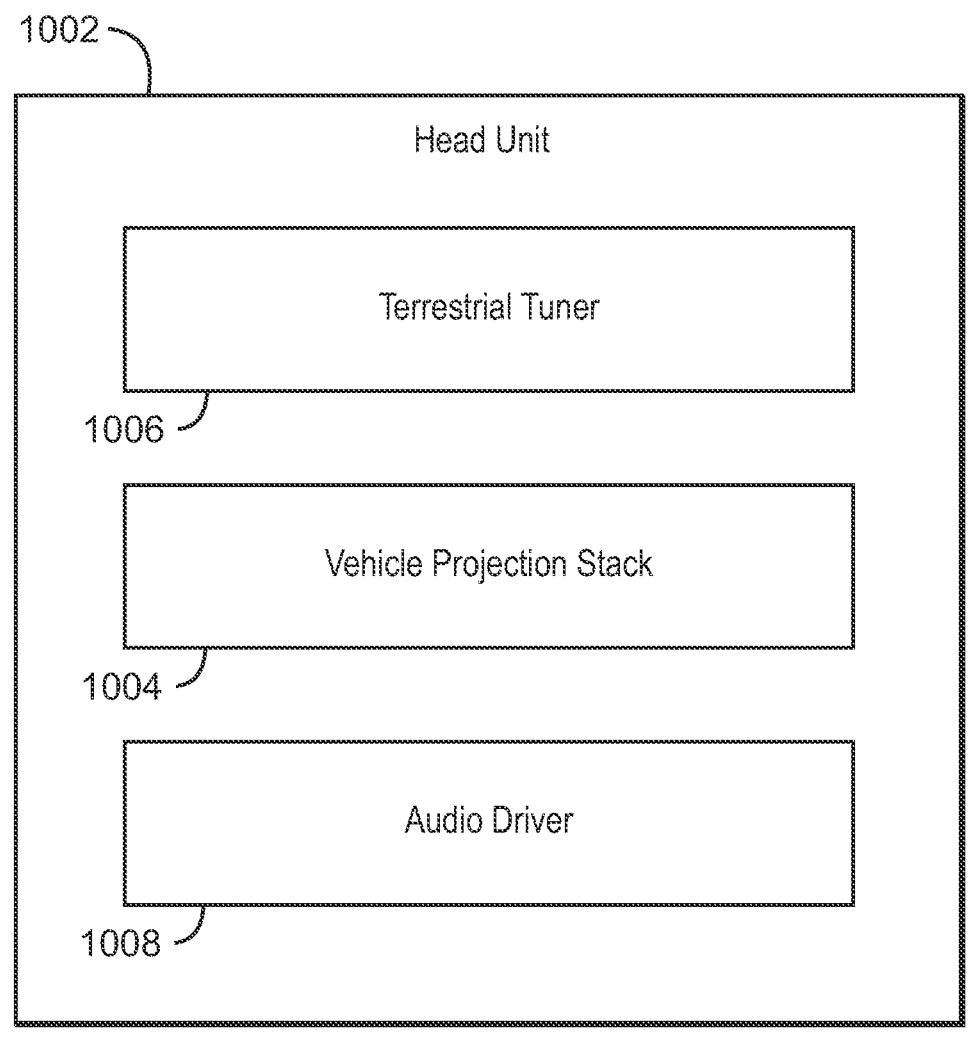
FIG. 10 is a block diagram of an example system for integrating a terrestrial tuner into a projection mode of a user mobile device.

FIG. 10 is a block diagram of an example system 1000 for integrating a terrestrial tuner into a projection mode of a user mobile device. The example system 1000 may include a head unit 1002. The example system 1000 may include a vehicle projection stack 1004 to operate in the head unit 1002.

The example system 1000 may include a terrestrial tuner 1006 communicatively coupled to the vehicle projection stack to receive a terrestrial audio signal from a terrestrial source. The terrestrial audio signal may be a signal from frequency modulation (FM) radio, amplitude modulation (AM) radio, simulcast radio, satellite radio, DRM, or digital audio broadcasting (DAB) radio.

The example system 1000 may include an audio driver 1008 to provide an audio signal to a vehicle interior where the audio signal is from at least one of the terrestrial audio signal and an internet audio signal received at the vehicle projection stack from a user mobile device located inside the vehicle interior. The internet audio signal may be provided by a uniform resources locator (URL) sent according to hypertext transfer protocol secure (HTTPS).

In an example, the vehicle projection stack provides radio station identification information to the user mobile device. In this example, the vehicle projection stack instructs the head unit to display supplemental information provided by the user mobile device, the supplemental information corresponding to the radio station identification information provided to the user mobile device.

The audio quality of a terrestrial audio signal and the internet audio signal is compared on at least one of the head unit and the user mobile device, wherein the head unit instructs the audio driver to provide the audio signal determined to have the higher audio quality. In an example, the vehicle projection stack compares the royalty cost of the same media being provide by a terrestrial audio signal and the internet audio signal, the vehicle projection stack to instruct the audio driver to provide the audio signal determined by the vehicle projection stack to have the lower royalty cost.

The vehicle projection stack may provide metadata related to the terrestrial audio signal to a content application operating on the user mobile device. The vehicle projection stack may also request a linked service to the internet audio signal in response to a detection that the terrestrial audio signal drops below a field strength threshold. In this example, the head unit, in response to a signal received from a content application on the user mobile device, instructs the terrestrial tuner to reestablish a terrestrial audio signal in response to the linked service to the internet audio signal failing to reach an audio quality threshold at the audio driver or the request for the internet audio signal being returned with an error.

Figure 11:
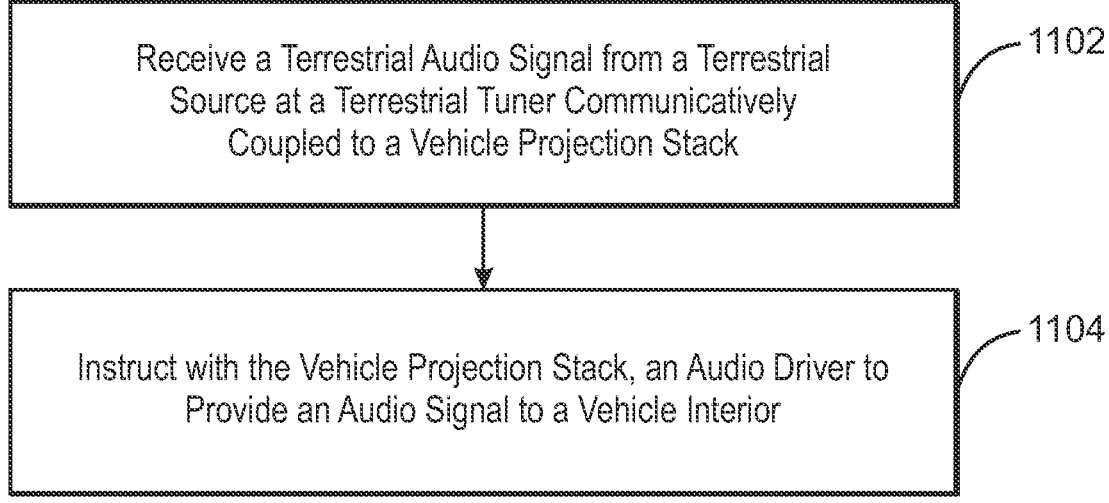
FIG. 11 is process flow diagram showing an example method for integrating a terrestrial tuner into a projection mode of a user mobile device.

FIG. 11 is process flow diagram showing an example method 1100 for integrating a terrestrial tuner into a projection mode of a user mobile device. The method may be implemented on any of the systems seen or referred to in FIGS. 1-10 and 12.

Process flow begins at block 1102 in which the terrestrial audio signal is received from a terrestrial source at a terrestrial tuner communicatively coupled to a vehicle projection stack, the vehicle projection stack operating in a head unit of a vehicle. The terrestrial audio signal may be a signal from frequency modulation (FM) radio, amplitude modulation (AM) radio, simulcast radio, satellite radio, digital radio mondiale (DRM), or digital audio broadcasting (DAB) radio. The internet audio signal may be provided by a uniform resources locator (URL) sent according to hypertext transfer protocol secure (HTTPS).

In an example method, the vehicle projection stack provides radio station identification information to the user mobile device. In this example, the vehicle projection stack instructs the head unit to display supplemental information provided by the user mobile device, the supplemental information corresponding to the radio station identification information provided to the user mobile device. At block 1104, the example method 1100 may include instructing, with the vehicle projection stack, an audio driver to provide an audio signal to a vehicle interior where the audio signal is from at least one of the terrestrial audio signal and an internet audio signal received at the vehicle projection stack from a user mobile device located inside the vehicle interior.

An audio quality of a terrestrial audio signal and the internet audio signal is compared on at least one of the head unit and the user mobile device, wherein the head unit instructs the audio driver to provide the audio signal determined to have the higher audio quality. In an example, a content application of the user mobile device compares the royalty cost of the same media being provide by a terrestrial audio signal and the internet audio signal, the vehicle projection stack to instruct the audio driver to provide the audio signal determined by the content application to have the lower royalty cost. The content application can utilize GPS location either from GPS instrumentation in the mobile device or that is a part of the vehicle and can query a back end server to understand related copyright costs for that region determined by the GPS. The content application can then make a decision informed by regional copyright costs.

In this example method 1100, the vehicle projection stack may provide metadata related to the terrestrial audio signal to a content application operating on the user mobile device. The vehicle projection stack may also request a linked service to the internet audio signal in response to a detection that the terrestrial audio signal drops below a field strength threshold. In this example, the head unit, in response to a signal received from a content application on the user mobile device, instructs the terrestrial tuner to reestablish a terrestrial audio signal in response to the linked service to the internet audio signal failing to reach an audio quality threshold at the audio driver or the request for the internet audio signal being returned with an error.

FIG. 12 is a block diagram of an example system 1200 for a vehicle with wireless communication components for integrating terrestrial tuner information. Like numbered items are as described above with respect to at least FIG. 11.

The system 1200 may additionally include a processor 1202 to operate in the head unit 1002. Further, the system 1200 may include a wireless communication component 1204 in the head unit to enable wireless communication to a user mobile device located inside a vehicle interior. As above, the system 1200 may include the terrestrial tuner 1006 communicatively coupled to the vehicle projection stack 1004 to receive a terrestrial audio signal from a terrestrial source. The terrestrial audio signal is a signal from frequency modulation (FM) radio, amplitude modulation (AM) radio, simulcast radio, satellite radio, or digital audio broadcasting (DAB) radio.

The system 1200 may include an audio driver 1008 to provide an audio signal to the vehicle interior where the audio signal is from at least one of the terrestrial audio signal and an internet audio signal received at the vehicle projection stack through the wires communication component connecting the head unit to the user mobile device located inside the vehicle interior.

In an example, the vehicle projection stack provides radio station identification information to the user mobile device. In this example, the vehicle projection stack instructs the head unit to display supplemental information provided by the user mobile device, the supplemental information corresponding to the radio station identification information provided to the user mobile device.

What is claimed is:

1. A system in a vehicle for integrating a projection mode of a user mobile device with a terrestrial tuner, the system comprising:

a head unit;

a vehicle projection stack to operate in the head unit;

a terrestrial tuner communicatively coupled to the vehicle projection stack to receive a terrestrial audio signal from a terrestrial source; and an audio driver to provide an audio signal to a vehicle interior where the audio signal is from at least one of the terrestrial signal and an internet signal received at the vehicle projection stack from a user mobile device located inside the vehicle interior; and wherein the head unit, in response to a signal received from a content application on the user mobile device, instructs the terrestrial tuner to reestablish the terrestrial signal in response to a linked service to the internet signal failing to reach an audio quality threshold at the audio driver.

2. The system of claim 1, wherein the terrestrial signal is a signal from frequency modulation (FM) radio, amplitude modulation (AM) radio, simulcast radio, satellite radio, digital radio mondiale (DRM), or digital audio broadcasting (DAB) radio.

3. The system of claim 1, wherein the vehicle projection stack provides radio station identification information to the user mobile device.

4. The system of claim 3, wherein the vehicle projection stack instructs the head unit to display supplemental information provided by the user mobile device, the supplemental information corresponding to the radio station identification information provided to the user mobile device.

5. The system of claim 1, wherein a content application of the user mobile device compares a royalty cost of media being provided by the terrestrial signal and the internet signal, the vehicle projection stack to instruct the audio driver to provide a signal determined by the content application to have the lower royalty cost.

6. The system of claim 1, wherein the vehicle projection stack provides metadata related to the terrestrial signal to a content application operating on the user mobile device.

7. The system of claim 1, wherein the internet signal is provided by a uniform resources locator (URL) sent according to hypertext transfer protocol secure (HTTPS).

8. The system of claim 1, wherein the vehicle projection stack requests a linked service to the internet signal in response to a detection that the terrestrial signal drops below a field strength threshold.

9. A method for integrating a projection mode of a user mobile device with a terrestrial tuner, the method comprising: receiving a terrestrial signal from a terrestrial source at a terrestrial tuner communicatively coupled to a vehicle projection stack, the vehicle projection stack operating in a head unit of a vehicle; and instructing, with the vehicle projection stack, an audio driver to provide an audio signal to a vehicle interior where the audio signal is from at least one of the terrestrial signal and an internet signal received at the vehicle projection stack from a user mobile device located inside the vehicle interior; and wherein the head unit, in response to a signal received from a content application on the user mobile device, instructs the terrestrial tuner to reestablish the terrestrial signal in response to a linked service to the internet signal failing to reach an audio quality threshold at the audio driver.

10. The method of claim 9, wherein the terrestrial audio signal is a signal from frequency modulation (FM) radio, amplitude modulation (AM) radio, simulcast radio, satellite radio, digital radio mondiale (DRM), or digital audio broadcasting (DAB) radio.

11. The method of claim 9, wherein the vehicle projection stack provides radio station identification information to the user mobile device.

12. The method of claim 11, wherein the vehicle projection stack instructs the head unit to display supplemental information provided by the user mobile device, the supplemental information corresponding to the radio station identification information provided to the user mobile device.

13. The method of claim 9, wherein an audio quality of the terrestrial signal and the internet signal is compared on at least one of the head unit and the user mobile device, wherein the head unit instructs the audio driver to provide the audio signal determined to have higher audio quality.

14. The method of claim 9, wherein a content application of the user mobile device compares a royalty cost of media being provide by the terrestrial signal and the internet signal, the vehicle projection stack to instruct the audio driver to provide the audio signal determined by the content application to have lower royalty cost.

15. A system for a vehicle with wireless communication components for integrating terrestrial tuner information, the vehicle comprising: a head unit; a processor to operate in the head unit; a vehicle projection stack to operate on the processor; a wireless communication component in the head unit to enable wireless communication to a user mobile device located inside a vehicle interior; a terrestrial tuner communicatively coupled to the vehicle projection stack to receive a terrestrial signal from a terrestrial source; and an audio driver to provide an audio signal to the vehicle interior where the audio signal is from at least one of the terrestrial signal and an internet signal received at the vehicle projection stack through the wireless communication component connecting the head unit to the user mobile device located inside the vehicle interior; and wherein the head unit, in response to a signal received from a content application on the user mobile device, instructs the terrestrial tuner to reestablish the terrestrial signal in response to a linked service to the internet signal failing to reach an audio quality threshold at the audio driver.

16. The system of claim 15, wherein the terrestrial signal is a signal from frequency modulation (FM) radio, amplitude modulation (AM) radio, simulcast radio, satellite radio, digital radio mondiale (DRM), or digital audio broadcasting (DAB) radio.

17. The system of claim 15, wherein the vehicle projection stack provides radio station identification information to the user mobile device.

18. The system of claim 17, wherein the vehicle projection stack instructs the head unit to display supplemental information provided by the user mobile device, the supplemental information corresponding to the radio station identification information provided to the user mobile device.

* * * * *